US006694590B1

(12) United States Patent
Jenkins

(10) Patent No.: US 6,694,590 B1
(45) Date of Patent: Feb. 24, 2004

(54) METHOD OF SETTING AUTOMOTIVE TRANSMISSION GEAR SELECTOR POSITION

(75) Inventor: Jon Jenkins, Zanesfield, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/113,369

(22) Filed: Mar. 29, 2002

(51) Int. Cl.[7] .......... B23P 17/00

(52) U.S. Cl. .......... 29/423; 29/407.1; 29/559; 29/281.5; 81/484

(58) Field of Search .......... 29/423, 559, 270, 29/281.1, 281.5, 407.01, 407.09, 407.1; 81/484; 70/237, 245, 246, 247, 249, 254; 74/334, 606 R

(56) References Cited

U.S. PATENT DOCUMENTS 1,554,468 A 9/1925 Tague
3,808,903 A * 5/1974 Sauer .......... 74/335
3,859,729 A * 1/1975 Pfeiffer .......... 33/606
4,321,844 A 3/1982 Krill .......... 81/3 R
4,324,149 A * 4/1982 Johansson et al. .......... 74/473.3
4,572,018 A * 2/1986 Hausinger .......... 74/397
4,802,391 A 2/1989 Willhoite et al. .......... 81/488
4,821,593 A * 4/1989 Kobylarz .......... 74/473.36
5,014,642 A 5/1991 Owen et al. .......... 116/28.1
5,271,115 A 12/1993 Senters .......... 81/484
5,272,931 A * 12/1993 Daniel .......... 74/473.1
5,417,126 A * 5/1995 DeCrouppe et al. .......... 74/473.1
5,570,619 A 11/1996 Goswick .......... 81/484
5,609,049 A * 3/1997 Rundle et al. .......... 70/202
5,626,063 A 5/1997 Kosbab .......... 81/488
5,651,293 A * 7/1997 Ebenstein .......... 74/473.3
5,682,789 A * 11/1997 DeCrouppe et al. .......... 74/335
5,875,695 A 3/1999 Zavilla .......... 81/488
5,899,100 A * 5/1999 Rundle et al. .......... 70/202
5,950,464 A * 9/1999 Tonne .......... 70/247
5,957,015 A 9/1999 Jackson .......... 81/484
6,095,310 A * 8/2000 Voda et al. .......... 192/220.6
6,269,708 B1 * 8/2001 Engenhorst et al. .......... 74/335
6,327,762 B2 12/2001 Kelleher .......... 29/267
6,374,978 B1 * 4/2002 Spencer .......... 192/220.3

* cited by examiner

*Primary Examiner*—Gregory Vidovich
*Assistant Examiner*—Essama Omgba
(74) *Attorney, Agent, or Firm*—Alan T McDonald; Vince Ciamacco; Standley Law Group LLP

(57) ABSTRACT

A method for ensuring the proper setup position of an automotive-type automatic transmission gear selector (shifter). The present invention utilizes a setting tool having an arcuate configuration. The setting tool may be inserted through a gear selector lever of a gear selector assembly, and rotated to provide for a slight biasing of the gear selector lever in a predetermined direction. The method is especially applicable to the setup of a gear selector, wherein the connector coupling the gear selector lever to the transmission is attached using a threaded fastener. The bias imparted by the setting tool counteracts the movement of the gear selector lever produced by the torque applied during tightening of the fastener.

34 Claims, 7 Drawing Sheets

METHOD OF SETTING AUTOMOTIVE TRANSMISSION GEAR SELECTOR POSITION

BACKGROUND AND SUMMARY OF THE INVENTION

The present application relates to the initial setup of an automotive transmission gear selector to an automotive transmission. More specifically, the present invention is a method for ensuring that the gear selector remains in the correct position when a connecting means coupling the transmission to the gear selector is attached thereto. The present invention ensures that after the connecting means is attached, movement of the gear selector will cause the transmission to be properly located in the selected gear.

In typical automotive design, a vehicle is provided with a transmission that couples the output of the vehicle's engine to the drive wheel, or wheels, of the vehicle. Commonly, the transmission is actually coupled to a differential, which is in turn used to drive the wheel(s). Transmissions may be of either the manual variety, wherein the operator of the vehicle manually shifts through the gears of the transmission, or automatic, wherein the transmission is programmed to shift on its own based on vehicle speed, engine speed, or other monitored characteristics.

An automatic transmission typically has a series of internal gears that may be brought together in various combinations to achieve the desired direction of travel, as well as the desired drive ratio. Other types of automatic transmissions, commonly referred to as variable transmissions, also exist, wherein the series of internal gears is substantially replaced by a belt, chain, or other similar drive mechanism. Such transmissions do not shift, as such is typically defined, but rather are designed to continuously vary the length of the belt or chain therein to effect continuously variable drive ratios. Each of these transmissions is typically equipped with several selectable gears. More specifically, each automatic transmission will typically have a "Park", "Neutral", and "Reverse" gear, as well as a primary "Drive" gear. Generally, such transmissions also are equipped with one or more secondary selectable drive gears—such as may be needed, for example, when pulling a trailer. Aside from the primary and secondary drive gears, such transmissions commonly restrict the other selectable gears (i.e., "Reverse") to a single drive ratio. The secondary drive gears are usually restricted to fewer internal drive ratios than the primary drive gear.

In either type of the automatic transmission mentioned above, gear changes are typically brought about by moving a gear selector lever located in the passenger compartment of the vehicle. The gear selector lever is generally located either on the steering column or on the floor. In either case, the gear selector lever is designed to be moved through the series of available gears. Normally, the gear selector lever is provided with detents or similar means that releasably restrain the gear selector lever in each gear. Thus, once the gear selector lever is placed in "Drive", for example, it will remain there until moved by the operator. There is generally a gear indicator associated with the gear selector lever, such that the operator is able to visually confirm the gear selection. The gear indicator may use a pointing device, change color, become illuminated, or otherwise operate to indicate what gear has been selected with the gear selector lever. The detent or other restraining means operates in conjunction with the gear indicator to ensure that the gear selector remains aligned with the proper gear indication.

The gear selector lever is typically coupled to one end of a connecting means, normally a cable, the other end of which is connected to the transmission. As the gear selector lever is moved through the selectable gears, the cable causes a corresponding movement of an actuator or other device on the automatic transmission, thereby placing the automatic transmission into the selected gear. To ensure that movement of the gear selector lever produces the proper movement at the transmission, an initial setup procedure is generally required. Often, the procedure is no more complicated than placing the gear selector lever in a particular gear, and attaching the corresponding end of the shift cable thereto (as the transmission end of the cable is ordinarily attached first). The detent or other restraining means will normally operate to keep the gear selector lever in the correct gear while the attachment process is accomplished. Attachment can be achieved by use of a multitude of fastening means, such as, for example, a bolt and nut, a pin, a clamp, or a variety of other suitable means. A threaded stud or other male fastener portion is often integrated into a portion of the gear selector lever for this purpose.

Although seemingly simple, this setup process can be problematic. The combination of the detent or other restraining means and the effort of the installer of the cable is usually sufficient to keep the gear selector lever in the proper gear during installation of the cable. However, it is still generally possible for a variation in the position of the gear selector lever to occur, while the gear selector lever remains in the selected gear. For example, it has been found that when a threaded male fastener is provided on a portion of the gear selector lever, and the shift cable is attached thereto using a nut, the clockwise rotation of the fastener assembly has a tendency to encourage the gear selector lever toward the direction of fastener rotation. Consequently, after the setup procedure, the gear selector lever may be biased toward either the previous or succeeding gear, depending on what side of the gear selector lever the cable is attached to.

The above situation may be problematic for several reasons. First, the gear selector lever may be biased so far in one direction that proper gear selection may be impeded due to misalignment between the gear selector lever and the actuator on the transmission. More likely however, is the situation wherein a slight misalignment of the gear selector lever translates into an improper movement of the shifter cable and connected actuator. While this may not impede the shifting of the transmission, it may cause problems with certain secondary systems associated therewith. For example, automatic transmissions commonly employ a release mechanism, such as a button or other actuator located on the gear selector lever, that must be activated in order to move the gear selector lever out of the "Park" position. Similarly, these transmissions may also have coupled thereto, certain safety devices that prohibit removal of the vehicle's ignition key from the vehicle's ignition unless the gear selector lever is returned to the "Park" position. To determine if the gear selector lever is indeed in the "Park" position, one or more sensors are typically used to detect the position of the actuator or some other relevant component of the transmission. These sensors are generally rather small and fairly sensitive, to ensure that the sensor is not triggered unless the gear selector lever is truly in the "Park" position. However, during setup, it may be possible for the gear selector lever to remain in gear, but to be sufficiently biased toward the previous or ensuing gear by the cable tightening operation that the sensor(s) either fails to emit a signal, or emits a premature signal. For example, the misalignment of the gear selector lever may cause the actuator on the transmission to fall short of, or overrun the sensor position—although the transmission may actually be in gear. In such a case, it may be impossible, for example, for the operator of the vehicle to remove the vehicle's ignition key. Similarly, other vehicle features relying on a signal from the sensor(s) may be rendered inoperative.

The invented method of setting gear selector position overcomes this problem. The method of the present invention allows a setting tool to be inserted through a portion of the gear selector lever, after the gear selector lever has been placed in the gear that will be used for setup. Subsequent rotation of the setting tool causes the gear selector lever to be biased slightly in the direction opposite that of the rotation required to tighten the connecting means fastener assembly. Thus, during the connecting means tightening operation, the gear selector lever is either prohibited from movement, or its movement is severely restricted. Consequently, by use of the method of the present invention, the connecting can be sufficiently fastened to the gear selector lever during the setup procedure without concern that the resulting positional relationship between the gear selector lever and the transmission actuator will be incorrect.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
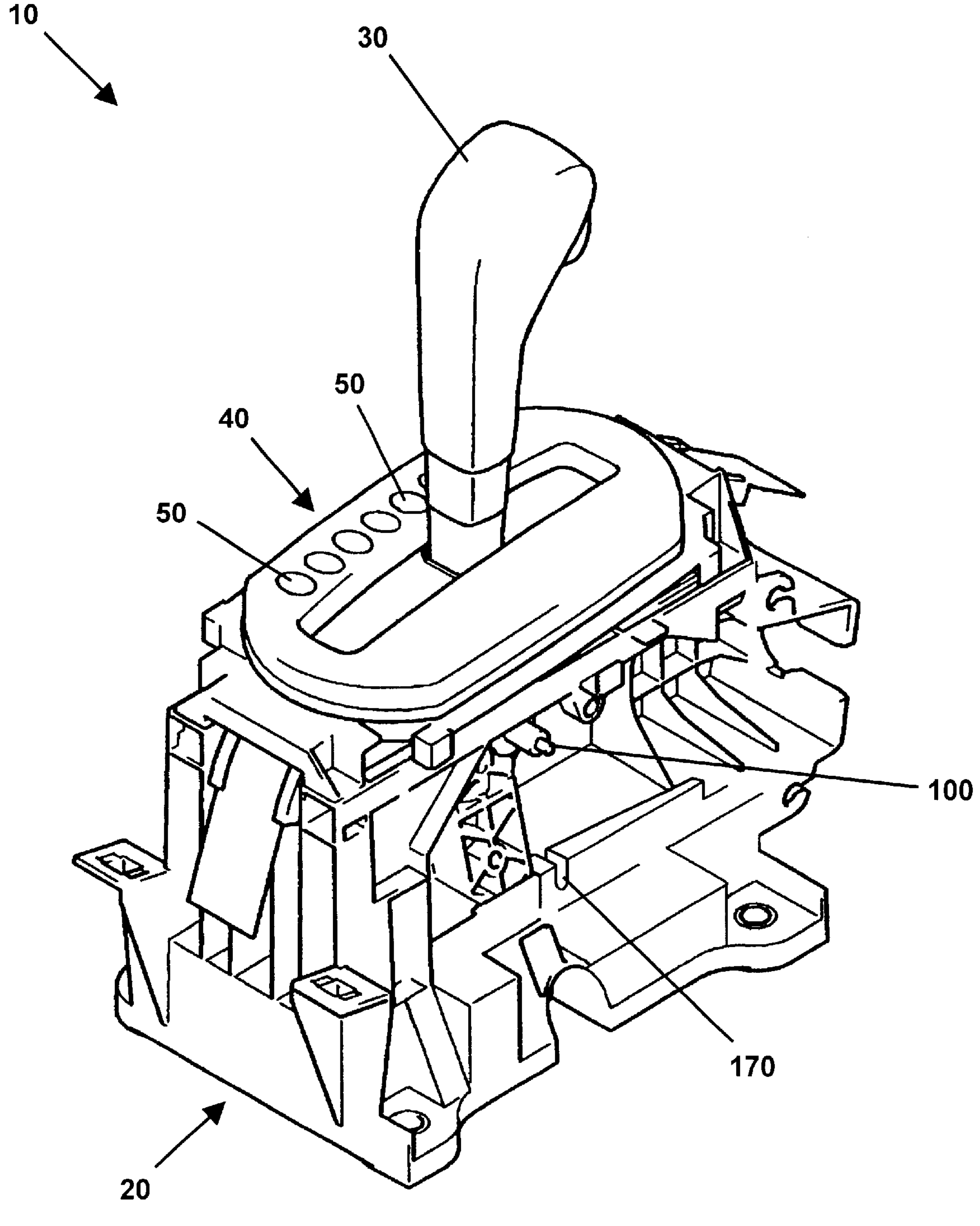
(PRIOR ART) FIG. 1
FIG. 1 is an isometric view of one embodiment of a gear selector assembly to which the method of the present invention may be applied.
Figure 2:
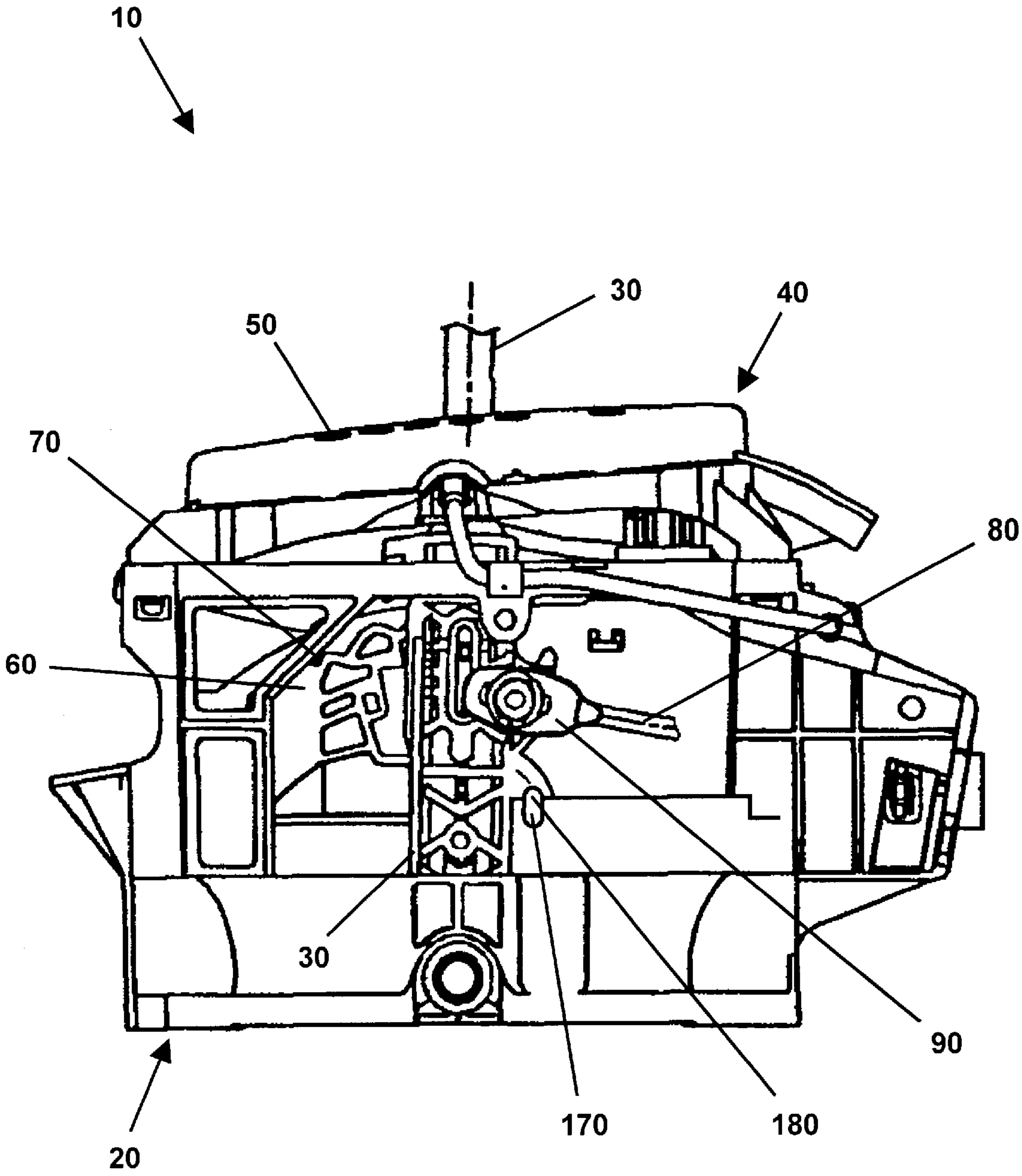
(PRIOR ART) FIG. 2
FIG. 2 is a side-elevational view of the gear selector assembly of FIG. 1.
Figure 3:
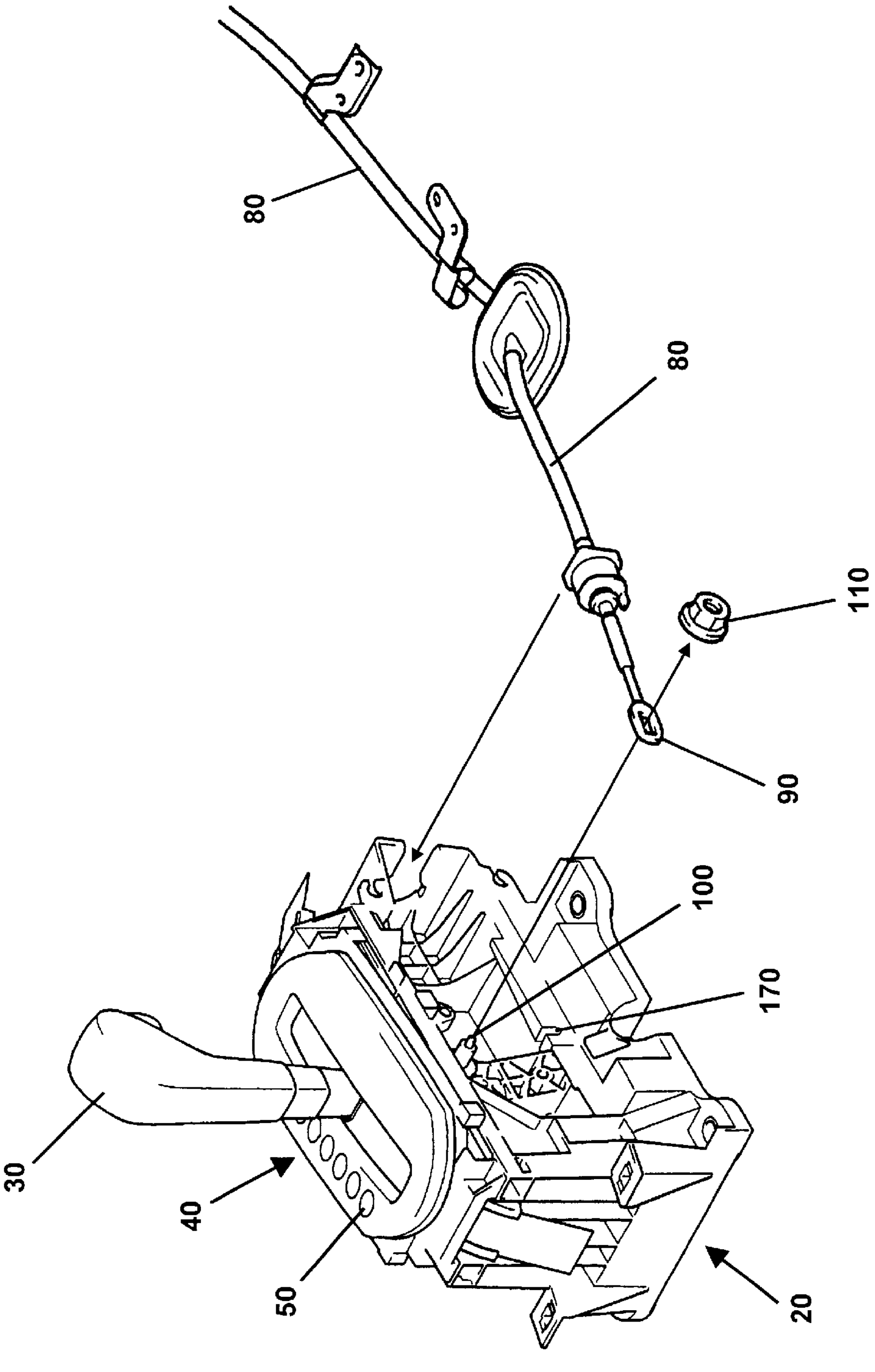
(PRIOR ART) FIG. 3
FIG. 3 is an isometric assembly view illustrating how a shift cable may be attached between an automotive transmission and a gear selector lever of the gear selector assembly of FIGS. 1–2.

One embodiment of a typical automatic transmission gear selector assembly 10 is illustrated in FIGS. 1–2. The gear selector assembly 10 is provided for location in the passenger compartment of a vehicle. As can be seen, the gear selector assembly 10 may have a base portion 20 that attaches to the floor or frame of the vehicle. A gear selector lever 30 extends upward from within the gear selector assembly 10. In this particular embodiment of the gear selector assembly 10, the gear selector lever 30 is pinned within the base portion 20, so that the gear selector lever may pivot. The gear selector lever 30 can be seen to extend upward through a gear indicator 40 that is provided to visually indicate the currently selected gear of the vehicle's transmission. Each indicia 50 on the gear indicator 40 corresponds to a different gear of the transmission.

A releasable retaining means is typically provided to maintain the position of the gear selector lever 30 once a gear has been selected. In this particular embodiment of the gear selector assembly 10, the retaining means is comprised of a detented cam 60 and pawl 70. However, it should be realized that the method of the present invention may also be employed when other retaining means are used. The pawl 70 mates with the different detents in the cam 60 as the gear selector lever 30 is pivoted through the gears by the vehicle operator.

A connecting means is typically provided to connect the gear selector lever 30 to the vehicle's transmission. In this particular embodiment of the gear selector assembly 10, the connecting means is a shift cable 80. However, the method of the present invention is also applicable when other connecting means are employed. A first end 90 of the shift cable 80 is adapted for attachment to the gear selector lever 30, and the other end (not shown) of the shift cable is adapted for connection to an actuator, linkage, or similar structure on the vehicle's transmission. In the gear selector assembly 10 shown, a threaded male fastener 100 is integrated into a portion of the gear selector lever 30 to allow for connection of the shift cable 80 thereto. Once the first end 90 of the shift cable 80 is placed over the threaded fastener 100, a nut 110 is used to secure the shift cable to the gear selector lever 30.

While the threaded fastener 100 and nut 110 provide for a convenient and effective means of securing the shift cable 80 to the gear selector lever 30, the rotation of the fastener assembly 100, 110 may also contribute to gear selector lever misalignment. An initial setup procedure is normally performed to calibrate movement of the gear selector lever 30 with shifting of the transmission. During the setup procedure, the gear selector lever 30 and the transmission are typically placed in the same preselected gear. For example, in this particular embodiment of the gear selector assembly 10, the gear selector lever 30 is first placed in the "Park" position. The first end 90 of the shift cable 80 is then placed over the threaded fastener 100, and the gear selector lever is moved to the "Neutral" position. In other embodiments, it is also possible to place the gear selector lever 30 in the "Neutral" position (or another desired position) prior to attaching the shift cable thereto. With the gear selector lever 30 and the transmission in the "Neutral" position, the nut 110 is affixed to the threaded fastener 100 to secure the shift cable 80 thereto.

During tightening of the nut 110, the detented cam 60 and pawl 70 operate to maintain the gear selector lever 30 substantially within the selected gear. The installer of the shift cable 80 may also restrain the gear selector lever 30 during the installation process. However, due to the torque imparted to the fastener assembly 100, 110, it may still be possible for the gear selector lever 30 to become misaligned. More specifically, the torque imparted to the fastener assembly 100, 110 will have a tendency to move the gear selector lever 30 toward either the previous or ensuing gear selection depending or the side of the gear selector assembly 10 to which the shift cable 80 is attached. In this particular embodiment of the gear selector assembly 10, the torque imparted to the fastener assembly 100, 110 will encourage the gear selector lever 30 toward the previous gear selection ("Reverse") position.

While the gear selector lever 30 may generally be maintained somewhere within the selected gear ("Neutral" in this example) during the setup procedure without great difficulty, ensuring a specific position within the gear selector lever's range of motion within that gear is much more difficult. And, while ensuring an exact position of the gear selector lever 30 within the range of motion may not be critical to causing the actual shifting of the transmission, it can be critical to the proper operation of secondary features, such as safety devices, that are tied to the position of the gear selector lever, or the actuator or linkage of the transmission. For example, the vehicle's ignition may be in communication with the transmission, to ensure that the vehicle's engine cannot be started without the transmission in "Park". Similarly, there may exist a safety feature wherein the vehicle's ignition key may not be removed from the ignition unless the transmission is in "Park".

To determine the current gear in which the transmission resides, or more commonly, the position of the actuator or linkage attaching the shift cable 80 to the transmission, a sensor, or sensors, are typically installed at the transmission. The sensor(s) detects the position of the actuator or some other relevant transmission component to determine if the transmission is in a particular gear. Typically, however, the sensor(s) is designed with a relatively narrow field of view, so as to detect the transmission component only when the component thereof is within a narrow positional range. This is necessary to ensure that the transmission is fully in gear. Unfortunately, if the gear selector lever 30 is slightly misaligned during the setup procedure, it may be possible for the sensed component to be outside the field of view of the sensor(s) even though the transmission is actually in gear. This may occur because a misalignment of the gear selector lever 30 is translated to the actuator or linkage of the transmission by the shift cable 80. As such, the sensed component may end up slightly outside the field of view of the sensor(s) when the gear selector lever 30 is placed in the corresponding gear. In this particular embodiment of the gear selector assembly 10, the torque applied to the fastener assembly 100, 110 will tend to encourage the gear selector lever 30 toward the previous gear. As a result, it may be possible for the sensed component to overrun the field of view of the sensor when the gear selector lever 30 and transmission are placed in the "Park" position. In such a case, secondary systems relying on a signal from the sensor (s) may not function. For example, it may be impossible for the vehicle operator to remove the vehicle's ignition key, because the sensor(s) is mistakenly indicating that the transmission is not in "Park".

The setting method of the present invention overcomes this problem. The method of the present invention employs a specialized setting tool 120 (FIGS. 4–7) during the setup procedure to ensure that the gear selector lever 30 is not moved too far toward the previous or succeeding gear. When applied to the particular embodiment of the gear selector assembly 10 shown in FIGS. 1–3 and 6–7, the setting tool 120 prevents the gear selector lever 30 from being encouraged too far toward the previous gear.

Figure 4:
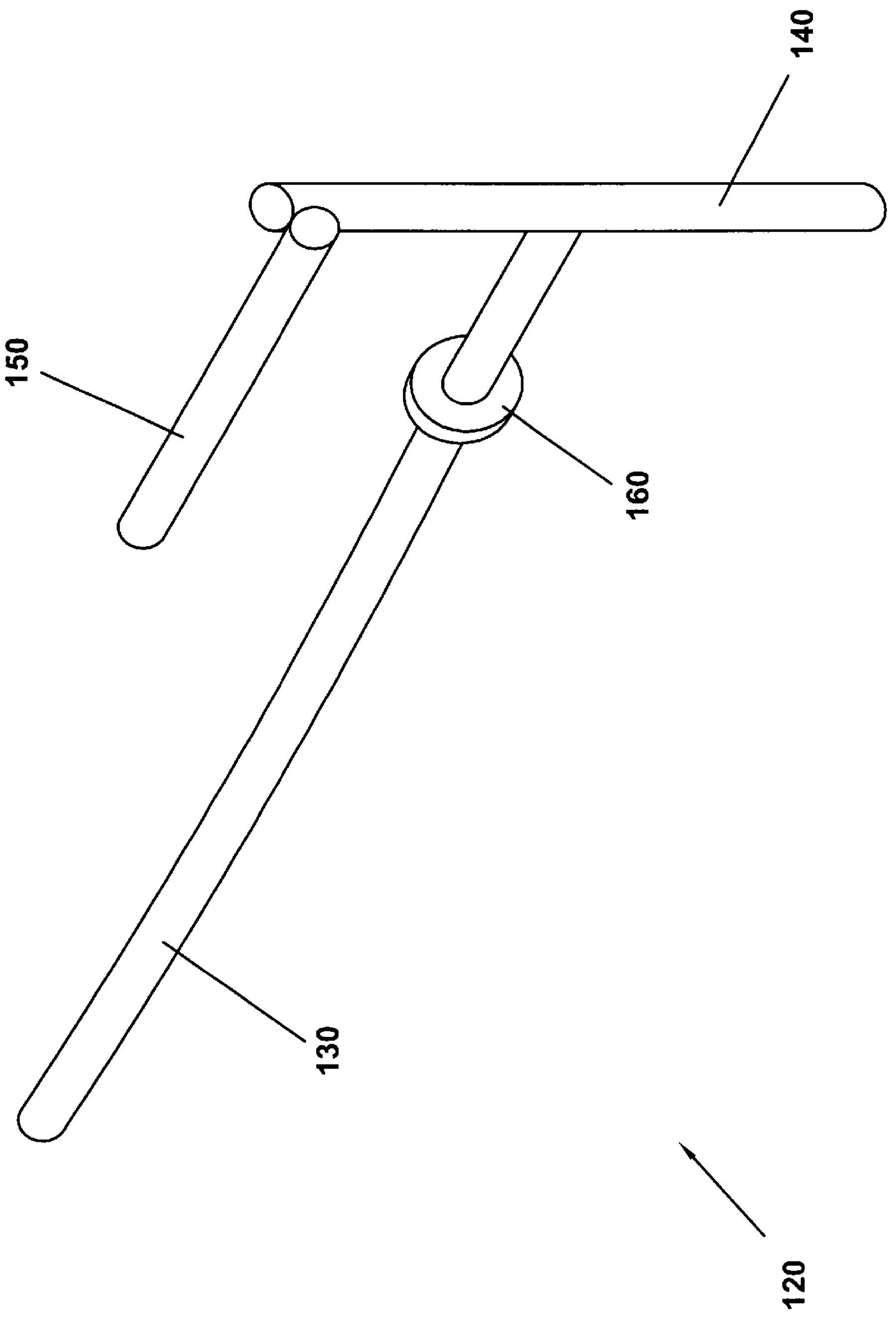
FIG. 4 is an isometric view of a setting tool that may be employed in the method of the present invention to properly set the position of an automotive transmission gear selector lever.
Figure 5:
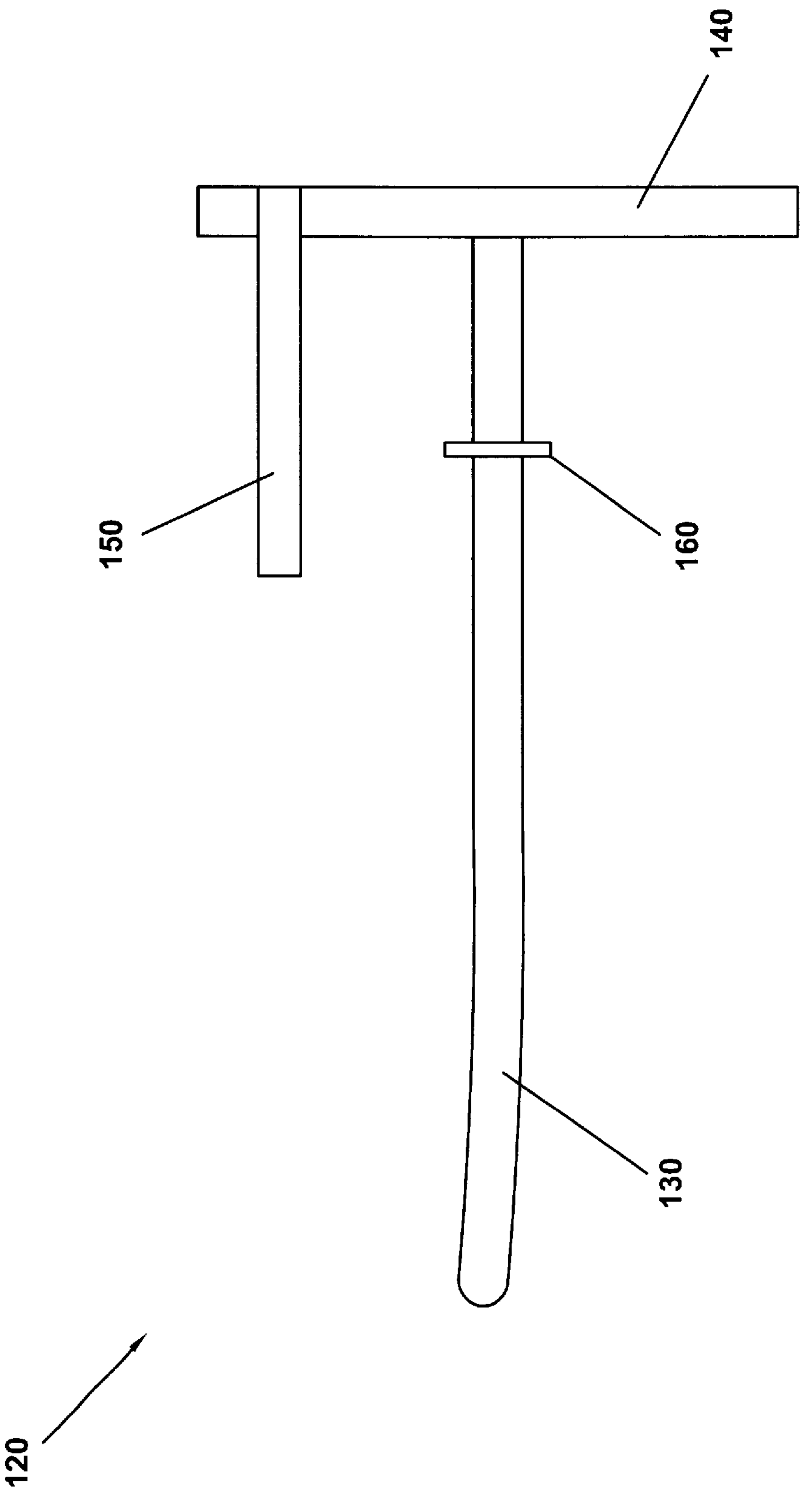
FIG. 5 is a side-elevational view of the setting tool of FIG. 4.
Figure 6:
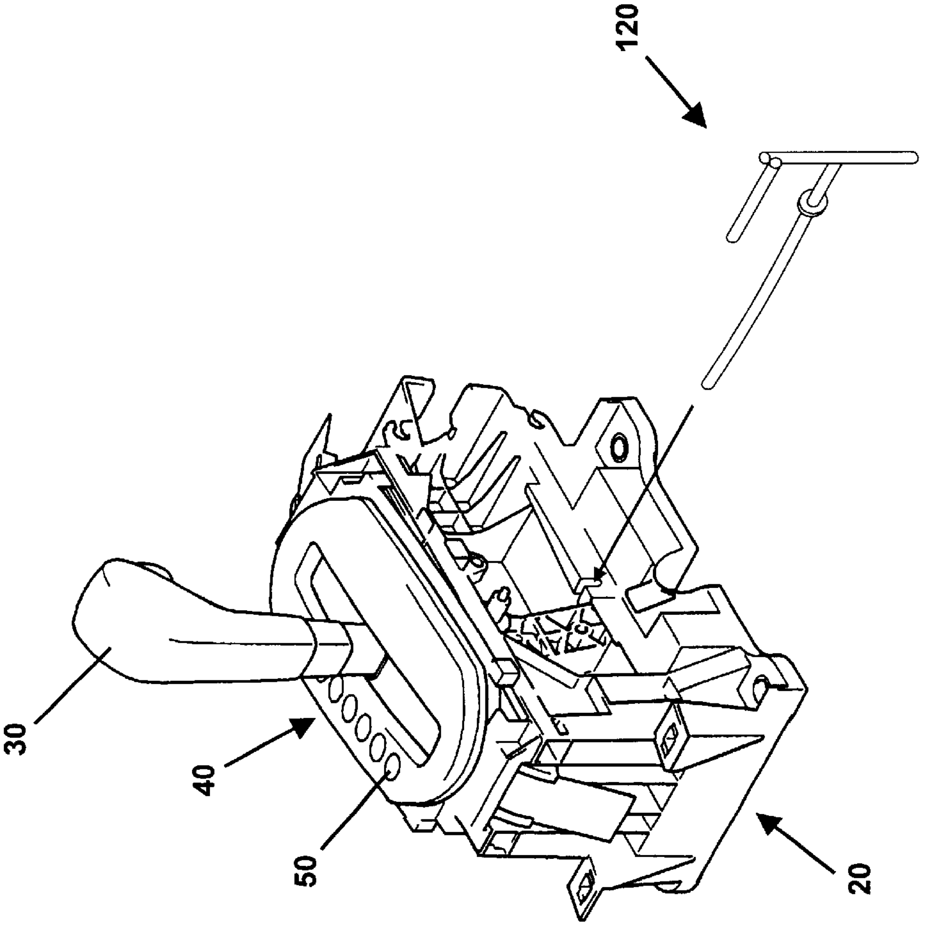
FIG. 6 is an isometric assembly view of the gear selector assembly of FIG. 1, illustrating how the setting tool of FIGS. 4–5 is installed thereto.

An exemplary embodiment of a setting tool 120 of the present invention can be observed in detail by reference to FIGS. 4–5. As can be seen, the setting tool 120 includes an elongated locating shaft 130. The locating shaft 130 has a proximal end that is preferably coupled to a handle 140, and a free, distal end. A rotational stop 150 is also provided. In this embodiment, the rotational stop 150 is also comprised of a shaft, however, the rotational stop may have a multitude of configurations, as dictated by the construction of the particular gear selector apparatus to which the setting tool 120 is installed. The rotational stop 150 may be coupled to the handle 140, or may extend from the locating shaft 130. As can be seen, the locating shaft 130 has an arcuate longitudinal configuration. The arcuate design allows the locating shaft 130 to cause a biasing of the gear selector lever 30. For example, use of the particular setting tool 120 with the particular gear selector assembly 10 illustrated herein, results in a rearward bias of the gear selector 30 of approximately 1 millimeter. However, other biasing distances may be achieved as necessary. Thus, as can be observed, the locating shaft 130 is used to position the gear selector lever 30, while the rotational stop 150 ensures that the setting tool 120 is properly oriented. The setting tool 120 may also include an insertion stop 160 that dictates the installed longitudinal position of the setting tool. The setting tool 120 may be constructed from a variety of materials having sufficient formability to retain the arcuate configuration, and sufficient strength to bias the gear selector lever 30. In the particular embodiment shown in FIGS. 4–7, the setting tool 120 is manufactured from a steel compound.

The method of the present invention utilizes the setting tool 120 to ensure proper location of the gear selector lever 30 during the gear selector/transmission setup procedure. According to the method of the present invention, the first end 90 of the shift cable 80 is first placed over the threaded fastener 100. The gear selector lever 30 is then placed in a preselected gear, in this particular case, in "Neutral". In this particular embodiment of the gear selector assembly 10, the distal end of the locating shaft 130 of the setting tool 120 is then inserted through a first notch or aperture 170 in the base portion 20, and into a receiving aperture 180 located in the gear selector lever 30. The receiving aperture 180 is preferably of a slotted configuration to accommodate a portion of the arcuate shape of the locating shaft 130. As can be observed, the setting tool 120 is preferably inserted into the receiving aperture 180 of the gear selector lever 30 with the arcuate shape projecting downward. In this particular embodiment of the setting tool 120, this results in an installation position wherein the rotational stop 150 is located above the locating shaft 130, and wherein the handle 140 is substantially vertical. There may also be an additional aperture (not shown) provided in the opposite side of the base portion 20, and located to receive the distal end of the locating shaft 130 after it passes through the gear selector lever 30. The degree of insertion of the locating shaft 130 may be regulated by contact of the insertion stop 160 with the base portion 20. Although a particular gear selector assembly 10 is described and shown herein for purposes of illustration, the method of the present invention can also be successfully applied to gear selector assemblies of dissimilar configuration.

Once the locating shaft 130 is properly inserted into the gear selector lever 30, the setting tool 120 is rotated clockwise. The clockwise rotation of the setting tool 120 preferably continues until the rotational stop 150 contacts a predetermined portion of the gear selector assembly 10, which acts to dictate the set position of the setting tool. When using the method of the present invention to setup the particular gear selector lever 30 shown, the rotational stop 150 is designed to contact a top surface of the base portion 20. Preferably, the rotational stop 150 is located on the setting tool 120, such that when the rotational stop contacts the predetermined portion of the gear selector assembly 10, the arcuate shape of the locating shaft 130 impresses upon the gear selector lever 30.

Figure 7:
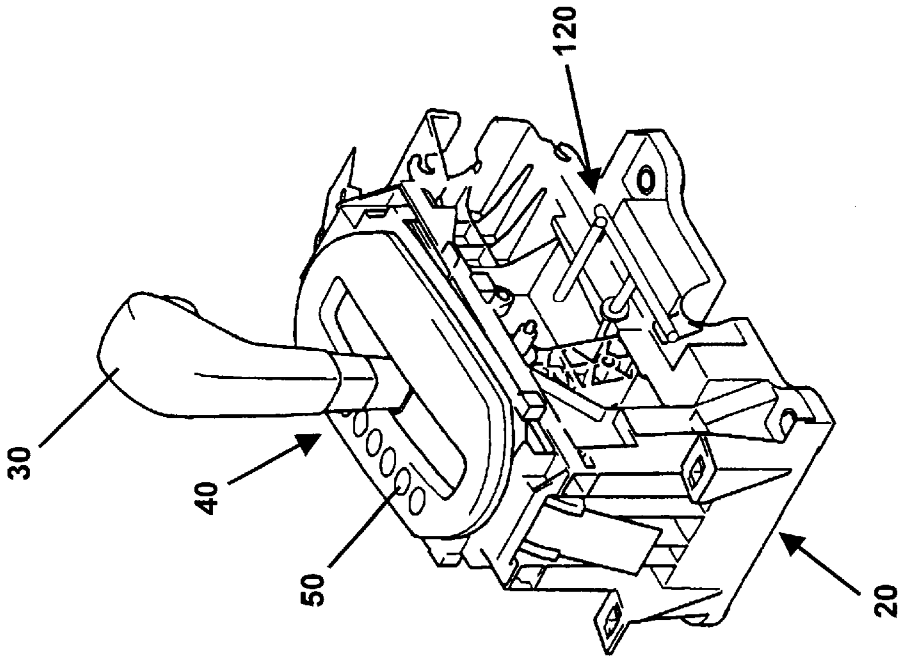
FIG. 7 depicts the gear selector assembly and setting tool of FIG. 6, with the setting tool fully installed thereto.

The set position of the setting tool 120 can be observed by reference to FIG. 7. Rotation of the setting tool 120 into the set position preferably causes a slight rearward bias of the gear selector lever 30. Once the setting tool 120 has been placed in the proper (set) position, the nut 110 can be tightened to the threaded fastener 100, thereby securing the shift cable 80 to the gear selector lever 30. The rearward bias imparted to the gear selector lever 30 by the setting tool 120 counteracts the tendency of the gear selector lever to move forward toward the previous gear during the fastener assembly 100, 110 tightening process. By using the setting tool 120, the position of the gear selector lever 30 is either maintained, or may move slightly toward the setting tool after attachment of the shift cable 80. In either case, use of the setting tool 120 ensures that the position of the gear selector lever 30 will remain substantially at the selected point within the range of motion of the selected gear. Once the shift cable 80 has been attached to the gear selector lever 30, the setting tool 120 can be rotated counterclockwise back to its insertion position, and removed.

Particular embodiments of a setting tool and a gear selector assembly have been disclosed above for purposes of illustrating the setting method of the present invention. However, it should be realized by one skilled in the art that the exact construction of the gear selector assembly may vary, and that the design of the setting tool may also vary accordingly while remaining within the spirit and scope of the present invention. Additionally, the method of the present invention may also be employed although different fastening means are used to secure the connecting means to the gear selector lever. Thus, the scope of the invention is not to be considered limited by the above disclosure, and modifications are possible without departing from the spirit of the invention as evidenced by the following claims.

What is claimed is:

1. A method of setting proper automotive transmission gear selector position, said method comprising:

placing a gear selector lever of a gear selector assembly and an associated transmission in a like, preselected gear;

inserting a setting tool through a portion of said gear selector assembly and into said gear selector lever;

rotating said setting tool so that an arcuate portion of said setting tool impresses upon said gear selector lever, thereby biasing said gear selector lever toward a desired position that is maintained by said setting tool;

securably connecting said gear selector lever to said transmission; and rotating said setting tool back toward its insertion position and removing said setting tool.

2. The method of claim 1, wherein a first end of a connecting means for linking said gear selector lever to said transmission is temporarily attached to said gear selector lever before said gear selector lever is placed into said preselected gear.

3. The method of claim 1, wherein a first end of a connecting means for linking said gear selector lever to said transmission is temporarily attached to said gear selector lever after said gear selector lever is placed into said preselected gear.

4. The method of claim 1, wherein a second end of a connecting means for linking said gear selector lever to said transmission is attached to said transmission before a first end thereof is attached to said gear selector lever.

5. The method of claim 1, wherein said gear selector lever is placed in the neutral position prior to securably connecting said gear selector lever to said transmission.

6. The method of claim 1, wherein said setting tool is inserted into said gear selector lever such that said arcuate portion is projecting downward.

7. The method of claim 1, wherein said setting tool is inserted through a first aperture in a base portion of said gear selector assembly and into a corresponding receiving aperture in said gear selector lever.

8. The method of claim 7, wherein said receiving aperture in said gear selector lever is of a slotted configuration.

9. The method of claim 7, wherein a second aperture is provided on an opposite side of said base portion of said gear selector assembly from said first aperture, such that said gear selector lever is located therebetween.

10. The method of claim 9, wherein said setting tool enters said second aperture after passing through said gear selector lever.

11. The method of claim 9, wherein said second aperture is of a slotted configuration.

12. The method of claim 1, wherein said setting tool is rotated approximately 90 degrees after insertion into said gear selector lever.

13. The method of claim 1, wherein rotation of said setting tool causes said gear selector lever to be biased in a direction opposite to a direction of rotation of a fastener used to securably connect said gear selector lever to said transmission.

14. A method of setting proper automotive transmission gear selector position, said method comprising:

placing a gear selector lever of a gear selector assembly in a preselected gear;

placing said transmission in said preselected gear;

temporarily attaching a first end of a connecting means from said transmission to said gear selector lever;

providing a setting tool, said setting tool comprising:

an elongated shaft, said shaft having an arcuate longitudinal configuration;

a handle; and a rotational stop;

inserting said elongated shaft of said setting tool through a first aperture in a base portion of said gear selector assembly and into a corresponding receiving aperture in said gear selector lever;

rotating said setting tool so that said arcuate configuration is impressed upon said gear selector lever, thereby causing a biasing thereof;

securing said first end of said connecting means to said gear selector lever; and removing said setting tool.

15. The method of claim 14, wherein said connecting means is temporarily attached to said gear selector lever before said gear selector lever is placed into said preselected gear.

16. The method of claim 14, wherein said connecting means is temporarily attached to said gear selector lever after said gear selector lever is placed into said preselected gear.

17. The method of claim 14, wherein a second end of said connecting means is attached to said transmission before said first end is attached to said gear selector lever.

18. The method of claim 14, wherein said gear selector lever is placed in the neutral position prior to fastening of said connecting means thereto.

19. The method of claim 14, wherein said setting tool is inserted into said aperture in said gear selector lever such that said arcuate configuration is projecting downward.

20. The method of claim 14, wherein said setting tool is rotated approximately 90 degrees after insertion into said gear selector lever.

21. The method of claim 14, wherein rotation of said setting tool causes said gear selector lever to be biased in a direction opposite to a direction of rotation of a fastener used to secure said connecting means to said gear selector lever.

22. The method of claim 14, wherein a second aperture is provided on an opposite side of said base portion from said first aperture, such that said gear selector lever is located therebetween.

23. The method of claim 22, wherein said elongated shaft enters said second aperture after passing through said gear selector lever.

24. The method of claim 22, wherein said second aperture is of a slotted configuration.

25. The method of claim 14, wherein said receiving aperture in said gear selector lever is of a slotted configuration.

26. A method of setting proper automotive transmission gear selector position, said method comprising:

placing a gear selector lever of a gear selector assembly in a preselected gear;

placing said transmission in the same gear as said gear selector lever;

placing a first end of a cable over a threaded fastener located on said gear selector lever, the second end of said cable attached to said transmission;

providing a setting tool, said setting tool comprising:

a handle;

an elongated shaft having a proximal end attached to said handle and a free distal end, said shaft having an arcuate longitudinal configuration; and a rotational stop;

providing an aperture in a base portion of said gear selector;

providing a slotted aperture in said gear selector lever that is substantially aligned with said aperture in said base portion;

placing said setting tool into an insertion position by orienting said setting tool so that said arcuate configuration is directed downward;

inserting said distal end of said elongated shaft of said setting tool through said aperture in said base portion and into said slotted aperture in said gear selector lever;

rotating said setting tool so that said arcuate configuration is impressed upon said gear selector lever, thereby causing a biasing thereof in a direction opposite a direction of rotation required to install a nut to said threaded fastener;

securing said cable to said gear selector lever by installing a nut to said threaded fastener;

rotating said setting tool back to said insertion position; and removing said setting tool.

27. The method of claim 26, wherein said first end of said cable is placed over said threaded fastener on said gear selector lever before said gear selector lever is placed into said preselected gear.

28. The method of claim 26, wherein said first end of said cable is placed over said threaded fastener on said gear selector lever after said gear selector lever is placed into said preselected gear.

29. The method of claim 26, wherein said second end of said cable is attached to said transmission before the first end is attached to said gear selector lever.

30. The method of claim 26, wherein said gear selector lever is placed in the neutral position prior to securing of said cable thereto.

31. The method of claim 26, wherein said setting tool is rotated approximately 90 degrees after insertion into said gear selector lever.

32. The method of claim 26, wherein a second aperture is provided on an opposite side of said base portion from said first aperture, such that said gear selector lever is located therebetween.

33. The method of claim 32, wherein said distal end of said elongated shaft enters said second aperture after passing through said gear selector lever.

34. The method of claim 32, wherein said second aperture is of a slotted configuration.

* * * * *

UNITED STATES PATENT AND TRADEMARK OFFICE

CERTIFICATE OF CORRECTION

PATENT NO. : 6,694,590 B1
DATED : February 24, 2004
INVENTOR(S) : Jon Jenkins

It is certified that error appears in the above-identified patent and that said Letters Patent is hereby corrected as shown below:

Column 4,
Line 60, please delete “depending or the side” and insert -- depending on the side --.

Signed and Sealed this

Twenty-fifth Day of May, 2004

JON W. DUDAS
*Acting Director of the United States Patent and Trademark Office*